UNITED STATES PATENT OFFICE.

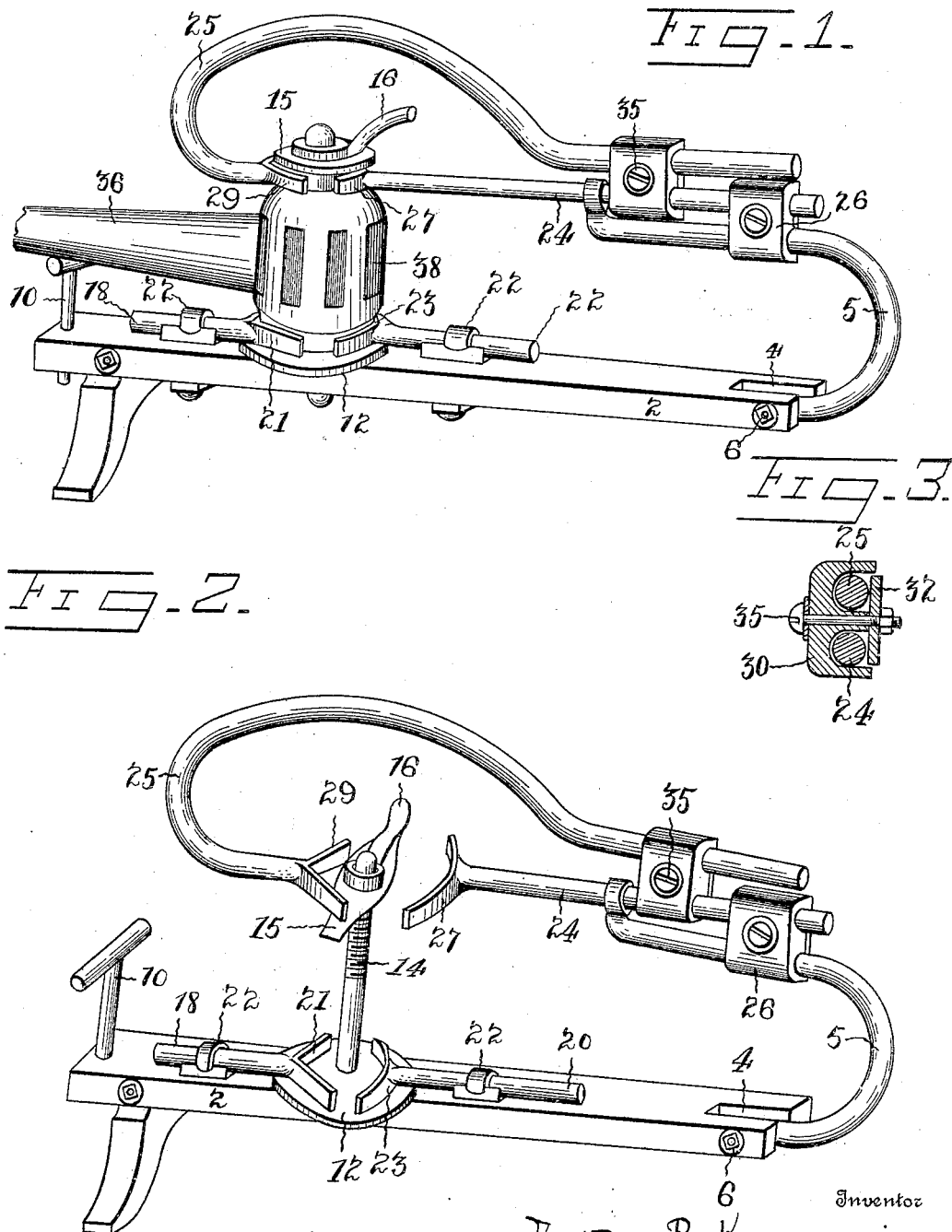

ARTHUR R. KUNZMANN, OF VOLGA, IOWA.

SPOKE-SETTER.

No. 929,957.  Specification of Letters Patent.  Patented Aug. 3, 1909.

Application filed June 10, 1908. Serial No. 437,783.

*To all whom it may concern:*

Be it known that I, ARTHUR R. KUNZMANN, a citizen of the United States, residing at Volga city, in the county of Clayton and State of Iowa, have invented a new and useful Improvement in Spoke-Setters, of which the following is a specification.

My invention relates to spoke setters and the object is to provide a device that will be cheap in construction and which will be effective in holding the hub in a given position while the spokes are being driven in. It is also designed for use in repair of wheels where the spokes are driven in by hand with a hammer or mallet, but may be used with power.

In what it consists, its details of construction and its manner of use will be fully set out in the following specification when taken in connection with the drawings accompanying the same and forming a part hereof.

Figure 1 is a perspective view of the device with a hub therein. Fig. 2 is a perspective view with the hub removed. Fig. 3 is a cross section of one of the clamps.

Referring to the drawings, 2 designates the base which is preferably made of heavy timber and provided with a hole or opening therethrough near its center. In one end is a slot 4 in which is pivoted or hinged an arm 5 by a bolt 6 and in the other end is adjustably secured a rest 10. Upon the base around the opening near the center is placed a circular plate 12, on which the hub to be operated upon, rests. Through the opening in the base and through the plate 12 passes a rod 14 provided with a plate 15 near the top. The top of the rod 14 is screw-threaded and thereon is screwed a hand screw 16. To the upper part of the base also are adjustably secured stays 18 and 20 by eye bolts 22 encircling the stays and passing through the base and are held by nuts upon the lower end of the bolts. The stay 18 is provided with an angular shaped bearing 21 adapted to engage one side of the hub and the stay 20 is provided with a crescent shaped bearing 23 adapted to engage the opposite side of the hub and the stays 18 and 20 together hold the hub at the base rigidly. They are also adjustably set so as to adapt them for hubs of different diameters. Upon the arm 5 is adjustably clamped a stay 24 by the adjustable clamp 26 and upon the stay 24 is adjustably clamped a stay 25 by the clamp 35. The stay 24 is of the same shape at its end 27 as the stay 20, and the stay 25 at its end 29 is of angular shape the same as stay 18 and these two stays are adapted to engage the neck of the upper end of the hub on opposite sides. The clamps 26 and 35 are shown in cross section in Fig. 3 and consist of two plates of iron 30 and 32, the plate 30 being curved on the inner side to conform to the curve of the arm 5 and of the stay 24 and the other plate may be flat. These two are bolted together by the bolt 35.

The manner of operating my device is substantially as follows: The arm 5 is turned back on its pivot or hinge 6, and this brings upward and backward the stays 24 and 25 away from the rod 14, the hub is placed on the plate 12 with the rod 14 through its center. The plate 15 is then placed upon the top of the hub and the hand screw 16 is screwed down upon the plate 15 and rigidly holds the hub 36 upon the plate 12 on the base 2. The stays 18 and 20 are then adjusted in the stay bolts 22 to grasp the base of the hub and the nuts upon the base of the eye bolts are drawn up rigidly, holding the stays in contact with the base of the hub and the hub rigidly upon the plate 12. The stays 24 and 25 are brought down to a position to attack the opposite sides of the neck of the hub and the bolts 35 are loosened and the stays 24 and 25 are adjusted against the top of the hub and the clamps 26 and 35 are brought into engagement with the stays 24 and 25 and the arm 5 and rigidly hold the stays 24 and 25 in engagement with the upper part of the hub. In this manner the hub is rigidly held at the top and bottom. The spoke 36 is then placed upon the rest 10 and engages with one of the spoke mortises 38 and is driven in by a mallet or sledge hammer in the usual manner.

It will be seen that the hub is held in all its parts so firmly that there will be no particular variation in the driving in of a spoke and this can be accomplished by any ordinary workman and does not require any skilled mechanic to operate it.

Having now described my invention what I claim is:—

1. In a spoke setter, a base, stays adjustably secured to the base upon opposite sides of the hub and adapted to engage the lower end of the hub, a rest for the spoke adjustably secured to the base, a curved arm pivoted or hinged to the base at the opposite end from the rest, a stay adjustably secured to said bent arm and adapted to engage one side of the hub, a second stay curved at one end and adjustably attached to the first stay and adapted to engage the opposite side of the hub and hold the top of the hub in a given position.

2. In a spoke setter, a base, a plate on the base upon which the hub rests, stays adjustably secured to the base and adapted to engage the opposite sides of the hub while the hub is on the plate, a rest for the spoke adjustably secured to the base at one end, an arm pivoted to the base at the opposite end from the rest, a stay adjustably clamped to said arm and adapted to engage the hub near the top on one side, a second stay adjustably clamped to the first stay and engaging the hub near its top on the opposite side from the engagement of the first stay and said stays and arm adapted to be turned upward and backward upon the pivot of the arm, and a rod passing through the hub, the plate and the base and provided with a hand screw to secure the hub on the plate.

ARTHUR R. KUNZMANN.

Witnesses:
S. C. AINSWORTH,
E. W. WHITE.